(12) United States Patent
Hamid (10) Patent No.: US 7,113,622 B2
(45) Date of Patent: Sep. 26, 2006

(54) SWIPE IMAGER WITH IMPROVED SENSING CONTROL FEATURES

(76) Inventor: Laurence Hamid, 561 Brookridge Crescent, Ottawa (CA) K4A 1Z3

(*) Notice: Subject to any disclaimer, the term of this patent is extended or adjusted under 35 U.S.C. 154(b) by 797 days.

(21) Appl. No.: 10/133,500

(22) Filed: Apr. 29, 2002

(65) Prior Publication Data

US 2003/0002717 A1 Jan. 2, 2003

Related U.S. Application Data

(60) Provisional application No. 60/300,829, filed on Jun. 27, 2001, provisional application No. 60/300,830, filed on Jun. 27, 2001, provisional application No. 60/300,831, filed on Jun. 27, 2001, provisional application No. 60/300,864, filed on Jun. 27, 2001.

(51) Int. Cl.
  *G06K 9/00* (2006.01)
(52) U.S. Cl. .................. 382/124; 382/126; 382/115
(58) Field of Classification Search ........ 382/124–125, 382/126
  See application file for complete search history.

(56) References Cited

U.S. PATENT DOCUMENTS

| | | | |
|---|---|---|---|
| 4,032,889 A * | 6/1977 | Nassimbene ................ 382/115 |
| 4,353,056 A | 10/1982 | Tsikos | |
| 5,109,427 A | 4/1992 | Yang | |
| 5,177,802 A * | 1/1993 | Fujimoto et al. ........... 382/124 |
| 5,187,748 A | 2/1993 | Lee | |
| 5,233,404 A | 8/1993 | Lougheed et al. | |
| 5,325,442 A | 6/1994 | Knapp | |
| 5,778,089 A | 7/1998 | Borza | |
| 6,097,035 A * | 8/2000 | Belongie et al. ............ 250/556 |
| 6,282,303 B1 * | 8/2001 | Brownlee ................... 382/124 |
| 6,324,310 B1 * | 11/2001 | Brownlee ................... 382/312 |
| 6,333,989 B1 * | 12/2001 | Borza ........................ 382/124 |
| 6,501,847 B1 * | 12/2002 | Helot et al. ................. 382/126 |
| 6,504,945 B1 * | 1/2003 | Helot et al. ................. 382/126 |
| 6,628,377 B1 * | 9/2003 | Sabatini et al. ............... 356/71 |

* cited by examiner

*Primary Examiner*—Bhavesh M. Mehta
*Assistant Examiner*—Utpal Shah
(74) *Attorney, Agent, or Firm*—Woodcock Washburn LLP (57) ABSTRACT

A fingerprint sensing device and recognition system includes a capacitive array of sense elements. A plurality of images is combined to form a composite image having an area that is greater than the area of a single captured image. The sensing device also features a spacer or spacers to allow for a reproducible sensing of the same fingerprint. Optionally, the spacer or spacers include a roller or rollers, which further optionally in conjunction with a monitoring device for determining motion of a surface being imaged device. Also optionally, th sensing devices includes a guiding channel as to allow for a well defined motion of the biological surface to be imaged. A method for sensing a biological surface using the fingerprint sensing device is also disclosed.

53 Claims, 4 Drawing Sheets

SWIPE IMAGER WITH IMPROVED SENSING CONTROL FEATURES

This application claims the benefit from U.S. Provisional Patent Application Nos. 60/300,829, 60/300,830, 60/300,831 and 60/300,864, all filed on Jun. 27, 2001.

FIELD OF THE INVENTION

This invention relates generally to imaging devices and more particularly to devices for imaging fingerprints and the like.

BACKGROUND OF THE INVENTION

Fingerprint analysis is amongst the most widely used and studied biometric techniques. During the last two decades, many new and exciting developments have taken place in the field of fingerprint science, summarized for example in the monograph *Advances in Fingerprint Technology, 2$^{nd}$ ed.*, edited by H. C. Lee and R. E. Gaensslen (CRC Press, 2001). Fingerprint identification not only plays a major role in forensic or police science, but also in controlling the building-access or information-access of individuals to buildings, rooms, and devices such as computer terminals.

When facing the task of actually imaging a given fingerprint, a problem associated with fingerprint imagers concerns the reliable and accurate transformation of the ridge and trough pattern of the fingertip into electrical or optical signals to be stored in a digital format. To achieve this task, optical systems are well known in the art, and were described for example in U.S. Pat. No. 5,109,427 to Yang issued Apr. 28, 1992, in U.S. Pat. No. 5,187,748 to Lee, issued Feb. 16, 1993, and in U.S. Pat. No. 5,233,404 to Lougheed et al. issued Aug. 3, 1993. However, such devices require sophisticated equipment and tend to be bulky and costly.

In an attempt to overcome some of the limitations and disadvantages associated with optical systems based on illumination of the fingertip, in U.S. Pat. No. 4,353,056 to Tsikos issued Oct. 5, 1982, an alternative kind of fingerprint imager that uses a capacitive sensing approach, is disclosed. The described sensor has a two dimensional array of capacitors, each of which comprises a pair of spaced electrodes, carried in a sensing member and covered by an insulating film. The sensors rely upon deformation to the sensing member caused by a finger being placed thereon, so as to locally vary the spacing between capacitor electrodes, and hence the capacitance of the capacitors, according to the ridge and trough pattern of the fingerprint. Although this device may not suffer from the problems associated with the kind of sensor employing an optical sensing technique, it suffers from its own problems. The difficulties that arise are mainly related to circuitry, the need of capacitor charging, and component connections. Thus, in another attempt to improve upon deficiencies and limitations of the aforementioned and other prior art, a further contact-imaging device is described in U.S. Pat. No. 5,325,442 to Knapp issued Jun. 28, 1994.

Knapp teaches a capacitance measuring imaging device in the form of a single large active matrix array, using deposition and definition by photolithographic processes of a number of layers on a single large insulating substrate. Although Knapp's attempt provides an improvement over Tsikos' device mentioned above, other disadvantages and limitations become evident in the implementation of a manufacturing process. Such a process relies on a single large imaging contact device, which often is a silicon die cut from a silicon wafer. Since a contact area of approximately 5 cm$^2$ is needed for imaging a fingerprint, the silicon devices are costly to manufacture, they have a low manufacturing yield, they are fragile, and thus have limited use in contact applications. These fragility and cost limits prohibit the widespread use of capacitive imaging of fingerprints.

Reducing the size of the imaging array is beneficial to limit cost and production yield limitations. That said, an imager with significantly reduced size is likely to be even more fragile than a larger imager. In U.S. patent application Ser. No. 09/984,354 filed on Oct. 30, 2001, an imaging system is described that includes a small capacitive array of sense elements in conjunction with a processor for forming a composite image of a fingerprint from a plurality of images of small sections of a single fingertip captured, for example, during a swiping motion. The sensing device is disposed between protective surfaces and supported by a flexible structure.

Unfortunately, due to friction between a fingertip and a swipe fingerprint sensor, the fingerprint imaged thereby is deformed. Different amounts of pressure, different dryness or moisture levels, different swipe speeds, and different swipe directions result in very different raw image data. Of course, for best results in fingerprint analysis, similar images are preferred and as such, reproducible imaging would be highly desirable. Unfortunately, this desire to have reproducible imaging frustrates widespread implementation of swipe fingerprint scanners such as the one mentioned above.

To make even better practical use of swipe fingerprint scanners, it would be advantageous to achieve enhanced control over the movement of the biological surface to be sensed relative to the swipe scanner surface, in at least one of space or time. A precise and well-controlled relative motion is particularly desirable in situations where the imager is operated in an environment with a high level of vibrational disturbance. It would be further advantageous to provide a device that reduces mechanical stress applied to the image-sensing device, thus increasing the robustness of the swipe imager.

OBJECT OF THE INVENTION

It is therefore an object of the present invention to provide a swipe fingerprint imager that reproducibly images a fingertip.

It is another object of the present invention to provide a swipe fingerprint imager that is relatively inexpensive and practicable to manufacture.

It is further an object to the present invention to provide a swipe fingerprint imager, wherein the motion of the biological surface to be scanned across a sensing element is well defined, thus allowing for the use of small scanning areas.

It is also an object of the present invention to provide a swipe fingerprint imager that is robust.

SUMMARY OF THE INVENTION

In accordance with an aspect of the present invention, there is provided a biometric sensing device comprising a swipe sensing pad for having a biological surface passed there across and comprising an array of sensing elements having at least two rows and two columns for sensing variation in the biological surface and for providing image data forming an image data sample in dependence thereon, and at least one spacer for providing a reproducible spacing between a biological surface being imaged and the swipe sensing pad, and for substantially effecting a same distortion due to friction in the image data for different image data samples from a same biometric information source.

In accordance with an aspect of the present invention, there is further provided a biometric sensing device comprising a swipe sensing pad for having a biological surface passed there across and comprising an array of sensing elements having at least two rows and two columns for sensing variation in the biological surface and for providing image data forming an image data sample in dependence thereon, at least one spacer for providing a reproducible spacing between a biological surface being imaged and the swipe sensing pad, and for substantially effecting a same distortion due to friction in the image data for different image data samples from a same biometric information source and a processor for receiving the image data from the swipe sensing pad and for processing the received image data to form a composite image of the biological surface from the image data.

In accordance with another aspect of the present invention, there is provided a biometric sensing device comprising a swipe sensing pad for having a biological surface passed there across and comprising an array of sensing elements having at least two rows and two columns for sensing variation in the biological surface and for providing image data forming and image data sample in dependence thereon, a processor for receiving and processing data, the swipe sensing pad being connected to the processor, and at least one roller, the roller being provided in vicinity to the swipe sensing pad, the axis of the roller being parallel to the longitudinal direction of the swipe sensing pad, so that the center of the swipe sensing pad and the center of the roller define a swipe direction for sensing variations in a biological surface, the direction being perpendicular to the axis of the roller, wherein the height of the roller is higher than the height of the swipe sensing pad.

In accordance with another aspect of the present invention, there is further provided a biometric sensing device comprising a swipe sensing pad for having a biological surface passed there across and comprising an array of sensing elements having at least two rows and two columns for sensing variation in the biological surface and for providing image data forming an image data sample in dependence thereon, a processor for receiving and processing data, the swipe sensing pad being connected to the processor, and a guiding channel having a base and two side units, the base and the two side units constituting the boundaries of the guiding channel, the side units being attached to the base, and spaced apart by a predefined distance.

In accordance with yet another aspect of the present invention, there is provided a biometric sensing device comprising a swipe sensing pad for having a biological surface passed there across and comprising an array of sensing elements having at least two rows and two columns for sensing variation in the biological surface and for providing image data forming an image data sample in dependence thereon, a processor for receiving and processing data, the swipe sensing pad being connected to the processor, and a generally cylindrical platen having a continuous outer surface for supporting the plurality of arrays of sensing elements, the platen being rollingly engaged to a base.

In accordance with an aspect of the present invention, there is also provided a method for sensing a biological surface comprising the steps of providing a reproducible spacing between a biological surface to be imaged and a swipe sensing pad, and moving said biological surface to be imaged across said swipe sensing pad.

BRIEF DESCRIPTION OF THE DRAWINGS

Exemplary embodiments of the present invention will now be described in conjunction with the following drawings, in which similar reference numbers designate similar items.

DETAILED DESCRIPTION OF THE INVENTION

The present invention is based on the apparatus described in U.S. Pat. No. 5,778,089 to Borza issued Jul. 7, 1998, in U.S. Pat. No. 6,333,989 to Borza issued Dec. 25, 2001, and in U.S. patent application Ser. No. 09/984,354. The description of the present invention will therefore closely relate to the above-mentioned patents and application, and the parts of the disclosures of these patents and application not included in this specification are incorporated herein by reference.

The central unit of the present invention is a group of sensor elements comprising r rows or arrays (1 to r) with c sensing elements or columns (1 to c) in each row. In practice there are about 300 rows and 200 columns of regularly spaced elements occupying an area of approximately 3×2 cm². This area is for accepting a fingertip for scanning. The sense elements comprise a sensing electrode and an amplifier circuit wherein the amplifier circuit amplifies voltage induced in the sensing electrode by a biological source, for example a fingertip. The sense elements are arranged as to form a first swipe sensing pad, having a specific capacitive detective area, for sensing variations of a specific property of a biological source, and a second swipe sensing pad for detecting motion of the sensed variation.

As a fingertip is passed across the first and the second swipe sensing pad, successive rows across the fingertip are imaged. The resulting rows are known in one path dimension but the spacing of the rows along the other dimension is unknown. Therefore, a comparison of the imaging results from the first swipe sensing pad and those from the second swipe sensing pad is used to determine spacing and thereby allow for fingerprint reconstruction. Typically, a processor is used to correlate data previously received from the first swipe sensing pad and data received from the second swipe sensing pad to provide correlation results, which are indicative of a known physical distance between data sensed by the first swipe sensing pad and the data sensed by the second swipe sensing pad. The second swipe sensing pad does not need to be as topographically sensitive as the first swipe sensing pad. In this regard, the second swipe sensing pad may have a lower resolution than the first swipe sensing pad thereby reducing component costs.

Monitoring the motion of the biological source to be scanned allows one to use a total scanning area effectively smaller than the size of the area to be sensed. Timing and sequencing logic implemented in the correlation processor selects each element in the array in turn to produce a partial image of a fingerprint presented to the device. A series of partial images is used to construct a composite image of the fingerprint.

The use of a swipe sensing pad sufficient in breadth to span a surface to be imaged but insufficient along an orthogonal dimension to image the entire surface for capturing an image of a fingerprint requires that the swipe sensing pad senses and provides data at a rate to ensure that the data is correctly captured. It often is preferable to install a motion sensor that provides a separate data stream, informing the system of the relative motion of the fingertip along an axis substantially perpendicular to the breadth of the swipe sensing pad. It is advantageous to perform the process of image analysis in conjunction with the motion sensor data as this allows for compensation for slip in the motion sensor.

Figure 1A:
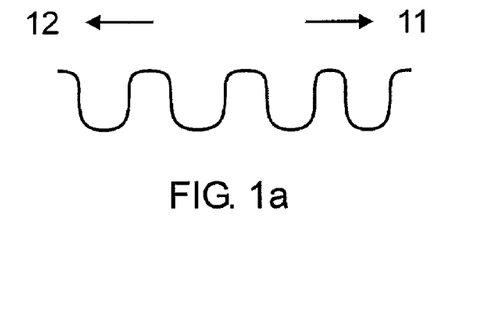
FIG. 1a is a side view representation of a fingerprint without any deformation.
Figure 1B:
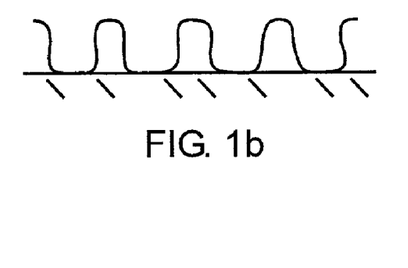
FIG. 1b is a side view representation of a fingerprint being deformed as it is pushed into a surface.

In FIG. 1a, a side view of the ridges of a fingertip is presented. The ridges are approximately smooth curves. Two possible swipe directions are indicated in the drawing, a first direction 11, and a second direction 12, being direction opposite to the direction 11. When the fingertip is statically pressed against a contact imager such as a swipe sensing pad or a prior art optical contact imager, as illustrated in FIG. 1b, the ridges become flattened due to pressure of the fingertip against the platen. Also, the ridges tend away from the point of maximum pressure. This tendency is usually slight and normally does not affect fingerprint analysis.

Figure 1C:
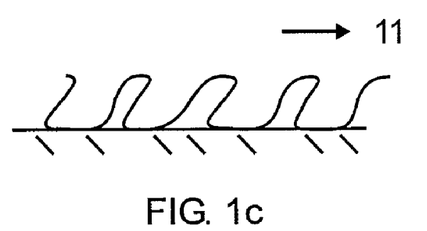
FIG. 1c is a side view representation of a fingerprint being deformed as it is pushed into a surface and dragged in a first direction.
Figure 1D:
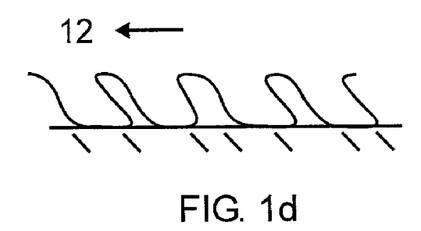
FIG. 1d is a side view representation of a fingerprint being deformed as it is pushed into a surface and dragged in a second direction.

In FIG. 1c, a side view of the ridges of a fingertip is presented, as the fingertip is swiped across a platen in the direction 11. Swiping of a fingerprint may be necessary, when the area of the sensing device is too small to monitor the fingerprint as one single image, and when the complete image is reconstructed from a series of partial images. Here, the ridges are deformed being pulled in one direction 11 by friction of the platen. FIG. 1d shows a similar diagram for the fingertip being swiped in the opposing direction 12. As is evident, the ridges move relative to the finger and the effects of swiping the finger in opposite directions are different resulting in different fingerprint images. Those differences are often sufficient to effect image analyses and automated fingerprint recognition. Further, if a fingertip is swiped across the swipe sensing pad back and forth, formation of a composite image is difficult due to the different distortions. Also, the distortion of the fingerprint pattern greatly complicates the process of sensing reproducible images in repeated scanning events.

Figure 2A:
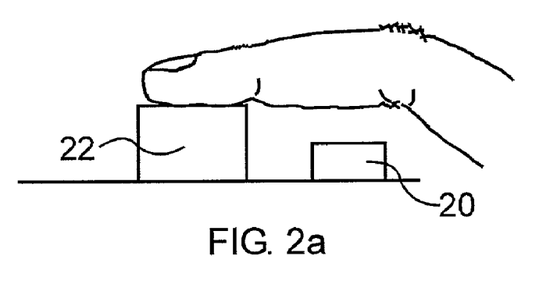
FIG. 2a is a diagram of an embodiment of the invention featuring a spacer in form of a parallelepiped, and a swipe sensing pad.

In FIG. 2a, a first embodiment of the present invention is shown. A swipe imager 2a comprises a swipe sensing pad 20 and a spacer 22 in form of a parallelepiped. The spacer 22 provides a distance between a biological surface to be sensed and the swipe sensing pad, thus reducing the amount of fingerprint deformation due to friction, and allowing for reproducible fingerprint imaging. As a further advantage of using the spacer 22, less of a mechanical stress is applied to the swipe sensing pad 20, reducing the risk of mechanical damage to the sensor array. Additionally, the spacer 22 helps to ensure that the surface of the finger being scanned is not being smeared against the scanning surface.

Many different configurations for a spacer are possible. For example, a raised profile will perform adequately. A parallelepiped or a plurality of parallelepipeds, a roller or a plurality of rollers, or any combination of one or more rollers and one or more parallelepipeds all are possible realizations of the raised profile.

Figure 2B:
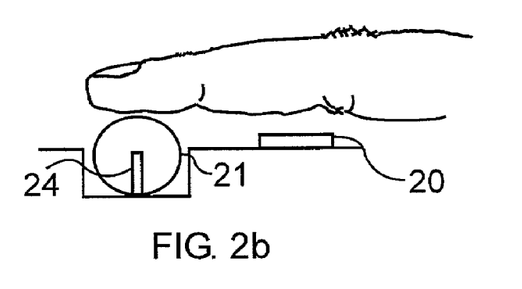
FIG. 2b is a diagram of an embodiment of the invention featuring a roller with a motion sensor as a spacing member, and a swipe sensing pad.

In FIG. 2b, a second embodiment of the present invention is illustrated. A swipe imager 2b comprises the swipe sensing pad 20 and a roller 21, which operates as the spacer. A mounting 24 for supporting the roller 21 is also provided. The roller 21 is provided with a motion sensor device, which reduces an amount of redundant information that the swipe sensing pad 20 captures, and provides additional information for image construction. Thus, for example, the swipe sensing pad 20 does not begin capturing data until the motion sensor registers the motion of the fingertip. Once the finger motion is acknowledged, additional information from the motion sensor allows for determining of the speed at which the finger is moving across the swipe sensing pad, and for adjusting the swipe sensing pad data capture frequency accordingly. Of course, the same advantages described for the spacer 22 in form of a parallelepiped do also apply for the roller 21 operating as a spacer.

Figure 3A:
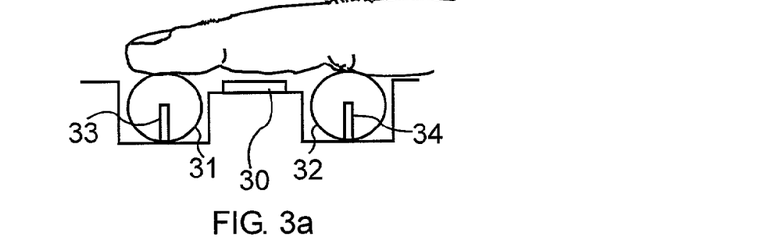
FIG. 3a is a diagram of an embodiment of the invention with two rolling elements as spacing members, and a swipe sensing pad mounted between them.
Figure 3B:
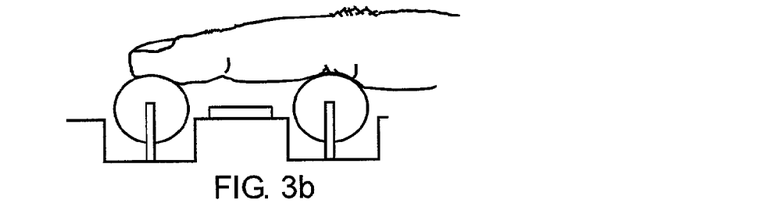
FIG. 3b is a representative diagram of human skin deformation caused by light stress contact with a multiple roller embodiment of the invention.
Figure 3C:
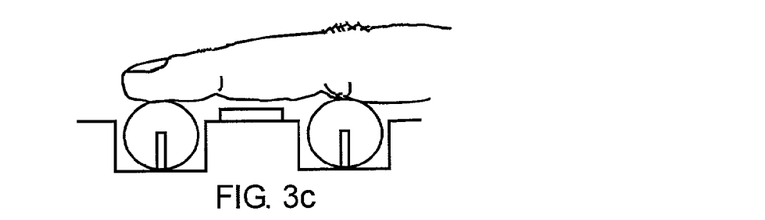
FIG. 3c is a representative diagram of human skin deformation caused by high stress contact with a multiple roller embodiment of the invention.

Referring to FIG. 3a, a second roller is incorporated into the embodiment of FIG. 2b. Thus, a capacitive swipe imager 3 comprises a swipe sensing pad 30, a first roller 31, and a second roller 32. Mountings 33 and 34 for supporting the rollers are also presented. The swipe sensing pad 30 is placed between said first and second rollers. Using this configuration has the benefit of alleviating compressive deformation of the fingertip in the region between the rollers, which is the region where the imaging device is situated. The reduced deformation is present regardless of the direction in which the fingertip is moved across the rollers along a same line. Of course, due to the curved upper surface of the rollers, increased pressure thereon results in the skin of the fingertip being stretched further across the circumference resulting in equal or less pressure between the rollers. This is shown in FIGS. 3b and 3c, respectively. As is evident from FIG. 3b, the fingertip rests at a height below the top of the rollers and closer to the swipe sensing pad in normal use. As the user pushes harder against the rollers, the skin stretches between the rollers, as shown in FIG. 3c, and consequently, any compressive deformation of the fingerprint is relieved. Thus, even if the user pushes excessively, the fingerprint will not be deformed substantially in the area of the scanner.

When additional pressure is applied, as illustrated in FIG. 3c, the fingertip rests slightly further from the swipe sensing pad but still within design tolerances. Of course, the distance between the rollers and the height of the top of the rollers from the swipe sensing pad surface affect the proximity of the skin to the swipe sensing pad and the effects of pressure applied by the fingertip. The additional pressure is absorbed by the rollers 31 and 32 and by the mountings 33 and 34 instead of by the swipe sensing pad, thereby preventing damage to delicate electronic components.

When a biasing device is used to absorb overpressure applied to the sensing element, it is preferred that the biasing device be mounted to the sensing element and rollers combination such that the rollers and sensing element are in fixed relation one to another. Alternatively, the rollers and sensing element are spaced differently depending on the applied pressure in order to result in approximately uniform spacing between the fingertip and the sensing element or, when in contact, to result in approximately uniform pressure there between. Optionally, some contact is maintained between the finger surface and the outer surface of the sensing element. This is a function of roller spacing and sensing element height relative to an upper surface of the rollers. Further, this is determined based on design requirements and other factors that are easily analyzed through simple experimentation to determine an ideal height between the rollers and the sensing element and distance between the rollers.

Optionally, the first roller of FIG. 3a is provided with a motion sensor. Further optionally, the second roller of FIG. 3a is also provided with a motion sensor. By receiving data from each of two motion sensors, false motion sensor data in the form of slip or additional spin are detectable. Thus the additional motion sensor data enhances the accuracy of the sensed motion of the fingertip in the vicinity of the swipe sensing pad. When, for example, one sensor indicates motion and the other does not, the error is indicative of less reliable data. Since image analysis is typically used in conjunction with motion sensor data to construct the composite image, the motion sensor data is validated by analysis of the image data. When both sensors are in accord, the image data is validated based on the sensor data and image analysis. Thus, three independent measures of skin motion are used in the construction of the composite image.

As another possibility, more than two rollers are provided to the swipe imager. In cases where more than one swipe sensing pad is present, the presence of more than two rollers allows to frame each sensor pad by a pair of rollers, thus establishing a defined motion and a defined spacing of the biological surface with respect to each of the swipe sensing pads.

In context of the devices described in FIGS. 2 and 3, many different configurations for a motion sensor are possible. For example, a roller with a simple rotational speed feedback element will perform adequately. Alternatively, a second continuously active scanner aligned perpendicularly to the first scanner will provide feedback signals useable to determine the speed of the finger as it swipes the first scanner. Further, as shown, the roller and the sensing array are combined into one single unit.

Figure 4A:
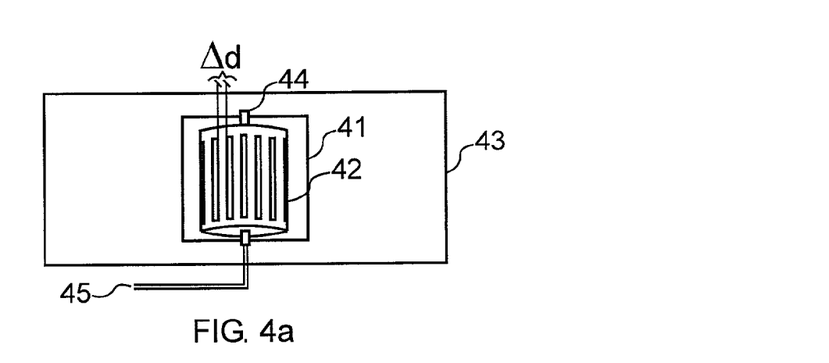
FIG. 4a is a diagram of an embodiment of the invention featuring an swipe sensing pad in a recess of a channel.

Referring to FIG. 4a, a top-view of a contact imaging device for imaging continuously a biological surface according to a further embodiment of the present invention is shown, in which the function of the roller and the sensing array are combined into one device. A roller 41 having affixed to the surface thereof a plurality of arrays 42 of capacitive imaging elements, each of which is made of a plurality of individual sensing elements (not shown), is provided within a recessed body 43. The plurality of arrays 42 forms a swipe sensing pad. The arrays are separated by a known distance Δd.

Figure 4B:
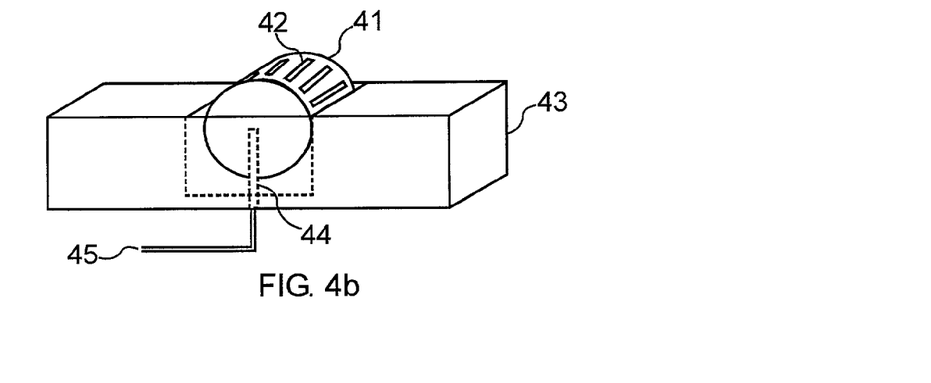
FIG. 4b is a diagram of an embodiment of the invention in which a set of rollers is used for positioning the fingertip.

Referring to FIG. 4b, a side-view of the contact-imaging device of FIG. 4a is shown. The roller 41 partially protrudes above the surface of the recessed body 43 for frictionally engaging a biological surface being swiped, for example, in the direction of the arrow. The swiping motion of the biological surface effectively drags the roller 41, causing the roller 41 to rotate within recessed body 43. Mountings 44 for supporting the roller are also provided. Further, a communication bus 45 for transmitting the data indicative of the imaged features of the fingerprint to a processor is provided, which optionally is integral with the mountings for supporting the roller. As such, the arrays of capacitive sensing elements 42, being embedded within the surface of the roller 41, are presented to different portions of the biological surface at different times. The spacing of the different scanned images produced by individual arrays is known because the distance Δd between a first and a second array is known. As an advantage, problems associated with swiping a fingertip at different rates are obviated since the spatial relationship between each of the plurality of sensing elements is known and invariant.

The rollers described in the above embodiments are cylindrical in shape. Optionally, the rollers do not have a flat cylindrical surface, but are provided with a concave indentation. This indentation serves to accept a finger or a fingertip, and to guide the finger or the fingertip during the process of imaging a biological surface. Advantageously, the concave indentation places the finger or fingertip at a defined position on the roller, where an integrated sensor is located. Further optionally, the rollers are provided with a convex lifting. This lifting serves to accept a palm, and to guide the palm during the process of imaging a biological surface.

Whereas the roller as described in FIGS. 2 to 4 provides an enhanced control in time over the motion of the biological surface to be scanned, it lacks the possibility to precisely control the spatial position of the biological surface with respect to the imaging device. Not only the relative orientation with respect to the individual sensing elements is important, but also the relative spacing between the sensing area and the biological surface.

Figure 5A:
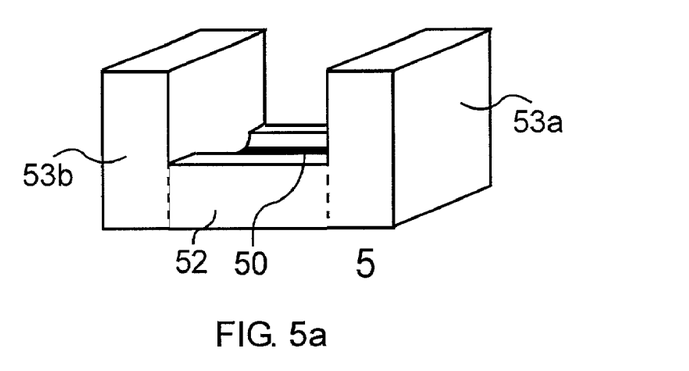
FIG. 5a is a diagram of a guiding channel that forces the fingertip against the swipe sensing pad.

Referring to FIG. 5a, in another embodiment of the invention the swipe sensing pad 50 is integrated into a guiding channel 5, comprised of a base 52 and two sidewalls 53a and 53b. The sidewalls are spaced apart as to snuggly but comfortably enclose a human index finger. The guiding channel limits the motion of a fingertip (not shown) to the correct direction, as it passes in close proximity to the swipe sensing pad. The swipe sensing pad is mounted in a recess in the base 52 of the channel to prevent excessive pressure being placed upon it while in use.

Figure 5B:
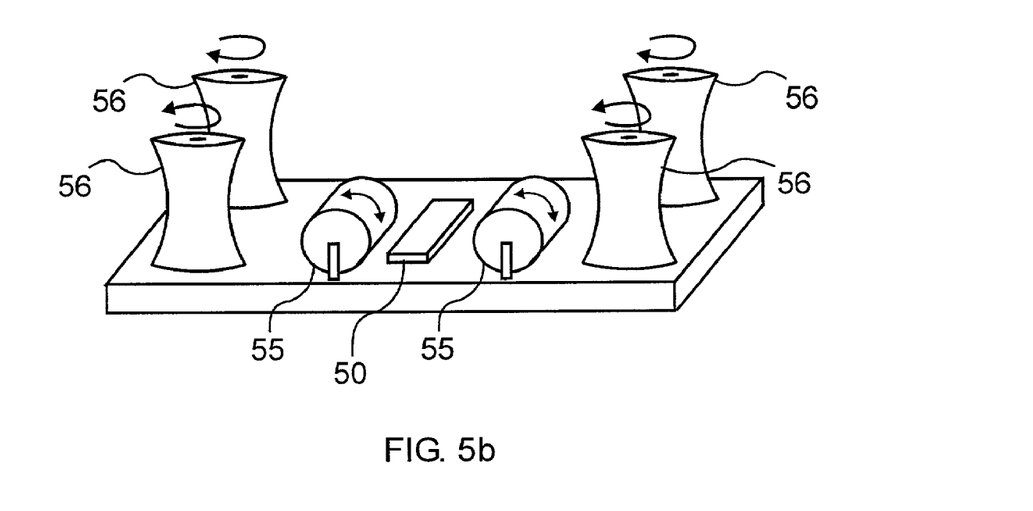
FIG. 5b is a diagram of an embodiment of the invention in which opposed parts are used to guide the fingertip over the swipe sensing pad.

FIG. 5b illustrates, how horizontal rollers 55 and vertical rollers 56 form the walls of the guiding channel 5. This alleviates stresses on the user's fingers while maintaining pressure on the finger to maintain alignment. Advantageously, the horizontal rollers 55 are optionally provided with a motion-sensing device, and fulfill the same functionality as the ones described in FIGS. 1 to 3.

Figure 5C:
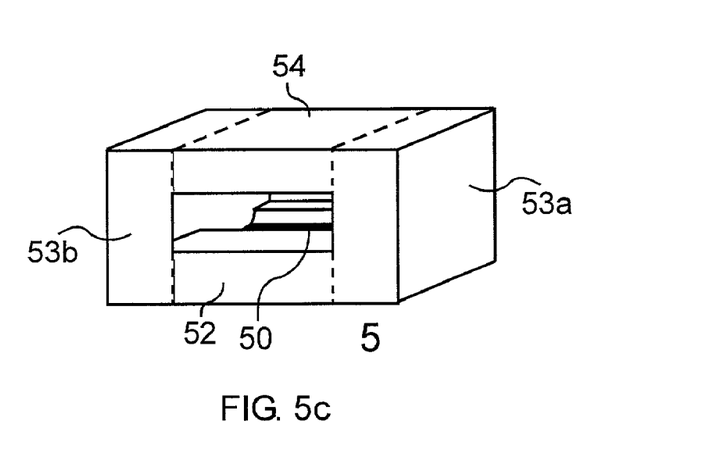
FIG. 5c is a diagram of an embodiment of the invention in which a guiding channel used to guide the fingertip over the swipe sensing pad.
Figure 5D:
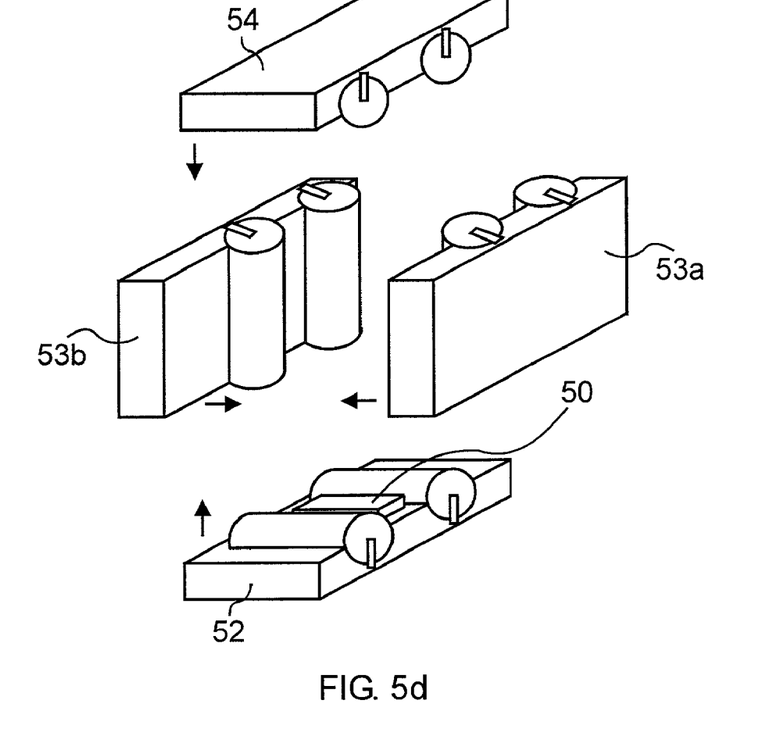
FIG. 5d is a diagram of an embodiment of the invention in which pairs of opposing sides are used to guide the fingertip over the swipe sensing pad.

Referring to FIG. 5c, the guiding channel 5 is shown but closed on four sides. This locks the finger into only a linear motion. Unfortunately, because different people have fingers of different sizes, such an embodiment is difficult to reliably construct. Therefore, as shown in FIG. 5d, an embodiment is presented, wherein pairs of opposing sides, such as base 52 and top 54, or the two sidewalls 53a and 53b, are biased one relative to another to secure the finger in place against the swipe sensing pad. The finger can be pushed into and pulled out of the housing but is maintained in an approximately linear direction of motion to improve quality of the fingertip image. The relative motion of each pair of sides relative to each other is for example achieved by sets of rollers, either horizontal 55 or vertical 56, which are attached to the sides in such a wide that a certain margin of horizontal or vertical movement is provided for. Such an embodiment is useful in environments with shock and vibration that would cause the fingertip to move in an unintended direction relative to the swipe sensing pad during a process of swiping. Again, the rollers are optionally used to provide motion related data signals for determining a location of the fingertip as it passes over the sensing element in order to facilitate composite image construction.

Figure 6:
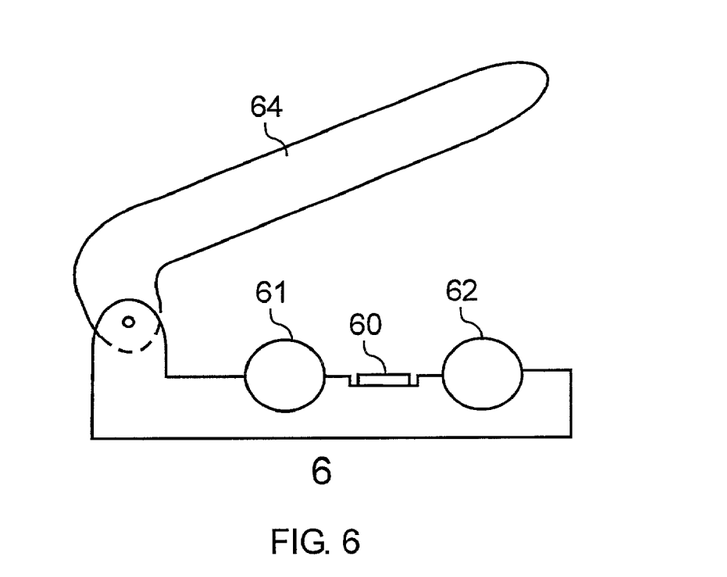
FIG. 6 is a diagram of an embodiment of the invention using a hinged mechanism ensuring that the fingertip leaves in the correct imaging direction.

Another embodiment of the present invention is illustrated in FIG. 6. A base 6 comprises an imaging device 60, a first roller 61, and a second roller 62. Hingedly attached to the base is a top cover 64, which can be opened and closed, as well as locked in a certain position. When closed, the base 6 and the top part 64 form a housing similar to the one described in FIG. 5c. When the housing is open, a finger, which fingertip is to be scanned, is placed on the base 6. The top 64 is swung close, and locked in a closed position. The housing is then pulled away from the finger or the finger is pulled from the housing. Thus, the fingerprint is imaged. This embodiment is particularly suitable for use in ambulances, since the fingerprint can be imaged even during vehicle motion and with a patient that is not conscious.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

What is claimed is:

1. A biometric sensing device comprising:
   a swipe sensing pad for having a biological surface passed there across in a swipe direction and comprising an array of sensing elements having at least two rows and two columns for sensing variation in the biological surface and for providing image data forming an image data sample in dependence thereon; and
   at least one spacer adjacent said swipe sensing pad in said swipe direction, the axis of the spacer being parallel to the longitudinal direction of the swipe sensing pad, for providing a reproducible separation of a biological surface being imaged from the swipe sensing pad during imaging of the biological surface, and for substantially effecting a same distortion due to friction in the image data for different image data samples from a same biometric information source.

2. A biometric sensing device defined in claim 1,
wherein the spacer includes a roller disposed on one side of the swipe sensing pad in the swipe direction for providing a reproducible separation of the biological surface being imaged from the swipe sensing pad during imaging of the biological surface.

3. A biometric sensing device defined in claim 2,
wherein the roller comprises a monitoring device for monitoring the motion of a biological surface when moved across the roller.

4. A biometric sensing device defined in claim 2,
wherein the swipe sensing pad and the roller guide a biological surface across the roller and the swipe sensing pad in the swipe direction, the axis of the roller being parallel to and adjacent a side of the swipe sensing pad in the swipe direction.

5. A biometric sensing device defined in claim 2,
wherein the swipe sensing pad and the roller guide a biological surface across the roller and the swipe sensing pad in the swipe direction, the axis of the roller being parallel to a longitudinal direction of the swipe sensing pad, the longitudinal direction defined by a greater number of sensors disposed along the longitudinal direction than along a latitudinal direction of the swipe sensing pad.

6. A biometric sensing device defined in claim 2,
wherein the spacer includes a second roller disposed on an opposing side of the swipe sensing pad from the roller in the swipe direction for providing a reproducible separation of a biological surface being imaged from the swipe sensing pad during imaging of the biological surface.

7. A biometric sensing device defined in claim 1,
wherein the spacer includes a raised profile disposed on one side of the swipe sensing pad for providing a reproducible separation of a biological surface being imaged from the swipe sensing pad during imaging of the biological surface.

8. A biometric sensing device defined in claim 7,
wherein spacer includes a second raised profile disposed on an opposing side of the swipe sensing pad in the swipe direction for providing a reproducible separation of a biological surface being imaged from the swipe sensing pad during imaging of the biological surface.

9. A biometric sensing device defined in claim 1,
wherein the spacer is a roller on which the swipe sensing pad is disposed such that frictional distortion is reduced over swipe sensing.

10. A biometric sensing device defined in claim 9,
wherein the roller comprises a monitoring device for monitoring the motion of a biological surface when moved across the roller.

11. A biometric sensing device defined in claim 1,
wherein the spacer comprises side walls parallel to the swipe direction used for maintaining the swipe direction within a predetermined range of directions less than 360 degrees.

12. A biometric sensing device defined in claim 1,
wherein the spacer comprises a guiding channel in the swipe direction disposed for receiving the biological surface and for restricting a motion of the biological surface in a direction across the swipe sensing pad to one direction, the guiding channel containing a plurality of rollers disposed on respective sides of the biological surface so as to rotate in the swipe direction as the biological surface is imaged.

13. A biometric sensing device defined in claim 1,
wherein the spacer comprises a motion limiting structure, the motion limiting structure being used for maintaining the swipe direction within a predetermined range of directions less than 360 degrees, and for limiting the pressure applied to the biometric sensing device by the biological surface to be lower than a predefined threshold pressure.

14. A biometric sensing device defined in claim 12, wherein the spacer comprises a guiding channel in the swipe direction disposed for receiving the biological surface and for restricting a motion of the biological surface in a direction across the swipe sensing pad to one direction, the guiding channel containing a plurality of rollers disposed on respective sides and a top and a bottom of the biological surface so as to rotate in the swipe direction as the biological surface is imaged.

15. A biometric sensing device defined in claim 1, wherein the array of sensing elements comprises capacitive sensors.

16. A biometric sensing device comprising:
a swipe sensing pad for having a biological surface passed there across in a swipe direction and comprising an array of sensing elements having at least two rows and two columns for sensing variation in the biological surface and for providing image data forming an image data sample in dependence thereon;
at least one spacer adjacent said swipe sensing pad in said swipe direction, the axis of the spacer being parallel to the longitudinal direction of the swipe sensing pad, for providing a reproducible separation of a biological surface being imaged from the swipe sensing pad during imaging of the biological surface, and for substantially effecting a same distortion due to friction in the image data for different image data samples from a same biometric information source; and
a processor for receiving the image data from the swipe sensing pad and for processing the received image data to form a composite image of the biological surface from the image data.

17. A biometric sensing device defined in claim 16, wherein the spacer includes a roller disposed on one side of the swipe sensing pad in the swipe direction for providing a reproducible separation of the biological surface being imaged from the swipe sensing pad during imaging of the biological surface.

18. A biometric sensing device defined in claim 17, wherein the roller comprises a monitoring device for monitoring the motion of a biological surface when moved across the roller.

19. A biometric sensing device defined in claim 18 comprising:
a processor for receiving motion data from the monitoring device and processing said data.

20. A biometric sensing device defined in claim 19, wherein the processor for receiving image data from the swipe sensing pad and for processing said data is the same processor for receiving motion data from the monitoring device and processing said data.

21. A biometric sensing device defined in claim 17, wherein the swipe sensing pad and the roller guide a biological surface across the roller and the swipe sensing pad in the swipe direction, the axis of the roller being parallel to and adjacent a side of the swipe sensing pad in the swipe direction.

22. A biometric sensing device defined in claim 17, wherein the swipe sensing pad and the roller guide a biological surface across the roller and the swipe sensing pad in the swipe direction, the axis of the roller being parallel to a longitudinal direction of the swipe sensing pad, the longitudinal direction being defined by a greater number of sensors disposed along the longitudinal direction than along a latitudinal direction of the swipe sensing pad.

23. A biometric sensing device defined in claim 21, wherein the spacer includes a second roller disposed on an opposing side of the swipe sensing pad in the swipe direction for providing a reproducible separation of a biological surface being imaged from the swipe sensing pad during imaging of the biological surface.

24. A biometric sensing device defined in claim 16, wherein the spacer includes a raised profile disposed on one side of the swipe sensing pad in the swipe direction for providing a reproducible separation of a biological surface being imaged from the swipe sensing pad during imaging of the biological surface.

25. A biometric sensing device defined in claim 22, wherein the spacer includes a second raised profile disposed on an opposing side of the swipe sensing pad in the swipe direction for providing a reproducible separation of a biological surface being imaged from the swipe sensing pad during imaging of the biological surface.

26. A biometric sensing device defined in claim 16, wherein the spacer is a roller on which the swipe sensing pad is disposed such that frictional distortion is reduced over swipe sensing.

27. A biometric sensing device defined in claim 26, wherein the roller comprises a monitoring device for monitoring the motion of a biological surface when moved across the roller.

28. A biometric sensing device defined in claim 16, wherein the spacer comprises a motion limiting structure, the motion limiting structure being used for maintaining the swipe direction within a predetermined range of directions less than 360 degrees.

29. A biometric sensing device defined in claim 28, wherein the spacer comprises a guiding channel in the swipe direction disposed for receiving the biological surface and for restricting a motion of the biological surface in a direction across the swipe sensing pad to one direction, the guiding channel containing a plurality of rollers disposed on respective sides of the biological surface so as to rotate in the swipe direction as the biological surface is imaged.

30. A biometric sensing device defined in claim 16, wherein the spacer comprises a motion limiting structure, the motion limiting structure being used for maintaining the swipe direction within a predetermined range of directions less than 360 degrees, and for limiting the pressure applied to the biometric sensing device by the biological surface to be lower than a predefined threshold pressure.

31. A biometric sensing device defined in claim 29, wherein the spacer comprises a guiding channel in the swipe direction disposed for receiving the biological surface and for restricting a motion of the biological surface in a direction across the swipe sensing pad to one direction, the guiding channel containing a plurality of rollers disposed on respective sides and a top and a bottom of the biological surface so as to rotate in the swipe direction as the biological surface is imaged.

32. A biometric sensing device defined in claim 16, wherein the array of sensing elements comprises capacitive sensors.

33. A biometric sensing device comprising:
a swipe sensing pad for having a biological surface passed there across in a swipe direction and comprising an array of sensing elements having at least two rows and two columns for sensing variation in the biological surface and for providing image data forming an image data sample in dependence thereon;

a processor for receiving and processing data, the swipe sensing pad being connected to the processor;

at least one roller, the roller being provided adjacent the swipe sensing pad in the swipe direction, the axis of the roller being parallel to the longitudinal direction of the swipe sensing pad, where the swipe direction is perpendicular to the axis of the roller; and wherein the height of the roller is higher than the height of the swipe sensing pad.

34. A biometric sensing device defined in claim 33, wherein the at least one roller comprises a monitoring device for monitoring the motion of a biological surface when moved across the at least one roller, the monitoring device being connected to the processor.

35. A biometric sensing device defined in claim 33 comprising:

at least two rollers, the axes of the rollers being parallel to each other, the at least two rollers being disposed on opposing sides of the swipe sensing pad in the swipe direction; and wherein the height of the second roller is equal to the height of the first roller above the swipe sensing pad.

36. A biometric sensing device defined in claim 35, wherein the at least one roller comprises a monitoring device for monitoring the motion of a biological surface when moved across at least one roller, the monitoring device being connected to the processor.

37. A biometric sensing device defined in claim 35, wherein said at least two rollers comprise a monitoring device for monitoring the motion of a biological surface when moved across at least one of the rollers, the monitoring devices being connected to the processor.

38. A biometric sensing device defined in claim 33, wherein the array of sensing elements comprises capacitive sensors.

39. A biometric sensing device comprising:

a swipe sensing pad for having a biological surface passed there across in a swipe direction and comprising an array of sensing elements having at least two rows and two columns for sensing variation in the biological surface and for providing image data forming an image data sample in dependence thereon;

a processor for receiving and processing data, the swipe sensing pad being connected to the processor; and at least one roller, the roller being provided adjacent the swipe sensing pad in the swipe direction, the axis of the roller being parallel to the longitudinal direction of the swipe sensing pad, where the swipe direction is perpendicular to the axis of the roller; and, a guiding channel having a base and two side units, the base and the two side units constituting the boundaries of the guiding channel, the side units being attached to the base, and spaced apart by a predefined distance defining side boundaries constraining the biological surface to movement in the swiping direction.

40. A biometric sensing device defined in claim 39 comprising:

side units that are spaced apart by approximately 1 to 3 cm.

41. A biometric sensing device defined in claim 39, wherein at least one of the boundaries of the guiding channel comprises at least one roller.

42. A biometric sensing device defined in claim 39, wherein all the boundaries of the guiding channel comprise at least two rollers.

43. A biometric sensing device defined in claim 41, wherein the at least one roller comprises a monitoring device for monitoring the motion of a biological surface when moved across the at least one roller, the monitoring device being connected to the processor.

44. A biometric sensing device as defined in claim 39, wherein the guiding channel further comprises a top section, the base and the top section being spaced apart by approximately 1 to 3 cm; and wherein the base, the side units and the top section define a cavity of a predefined size for accepting the biological surface.

45. A biometric sensing device as defined in claim 44, wherein said top section is hingedly attached to the base so as to open and close the cavity defined by the base, the side units and the top section.

46. A biometric sensing device defined in claim 39, wherein the array of sensing elements comprises capacitive sensors.

47. A biometric sensing device comprising:

a swipe sensing pad for having a biological surface passed there across in a swipe direction and comprising an array of sensing elements having at least two rows and two columns for sensing variation in the biological surface and for providing image data forming an image data sample in dependence thereon;

a processor for receiving and processing data, the swipe sensing pad being connected to the processor; and a generally cylindrical platen having a continuous outer surface for supporting the plurality of arrays of sensing elements, where the swipe direction is perpendicular to the axis of the platen; and, the platen being rollingly engaged to a base so as to rotate in the swipe direction.

48. A biometric sensing device defined in claim 47, comprising:

a flexible body for supporting the cylindrical platen.

49. A biometric sensing device defined in claim 47, wherein the cylindrical platen is disposed substantially surrounded by a rigid boarder in said base and countersunk therein.

50. A biometric sensing device defined in claim 47, wherein the array of sensing elements comprises capacitive sensors affixed to a surface of said cylindrical platen.

51. A method for sensing a biological surface comprising the steps of:

providing a reproducible separation of a biological surface to be imaged from a swipe sensing pad using at least one spacer adjacent said swipe sensing pad in a swipe direction, the axis of the spacer being parallel to the longitudinal direction of the swipe sensing pad, during imaging of the biological surface;

moving said biological surface to be imaged across said swipe sensing pad in a swipe direction; and restricting the motion of the biological surface to follow the swipe direction within a guide path restricted on either side of said guide path while maintaining said separation from said swipe sensing pad while moving across the swipe sensing pad.

52. A method defined in claim 51, further comprising the step of:

monitoring the motion of the biological surface while being moved across the swipe sensing pad.

53. A biometric sensing device defined in claim 47, wherein the array of sensing elements comprises capacitive sensors embedded within a surface of said cylindrical platen.

* * * * *

UNITED STATES PATENT AND TRADEMARK OFFICE
CERTIFICATE OF CORRECTION

PATENT NO.       : 7,113,622 B2                              Page 1 of 1
APPLICATION NO.  : 10/133500
DATED            : September 26, 2006
INVENTOR(S)      : Laurence Hamid It is certified that error appears in the above-identified patent and that said Letters Patent is hereby corrected as shown below:

Title Page,
Item [57], ABSTRACT,
Line 10, delete "optionally, th" and insert -- optionally, the --.

Column 4,
Line 38, delete "an swipe" and insert -- a swipe --.

Column 8,
Line 11, delete "Ad" and insert -- Δd --.

Column 9,
Line 16, delete "wide" and insert -- way --.

Signed and Sealed this

Tenth Day of April, 2007

JON W. DUDAS
*Director of the United States Patent and Trademark Office*